May 9, 1933. K. RUCKSTUHL 1,908,057
INSULATING MEANS AGAINST HEAT
Filed Nov. 28, 1930
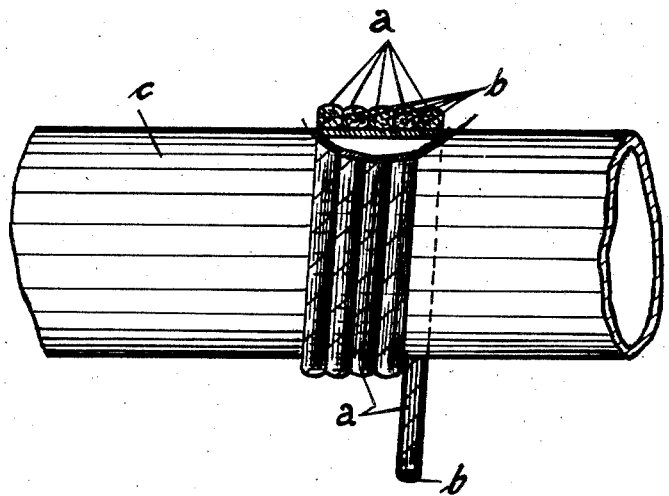
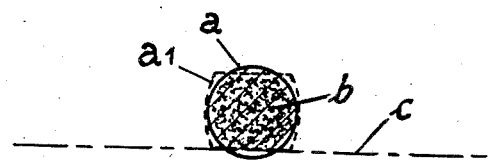
Inventor:
Karl Ruckstuhl
by S. Sokal,
attorney.

Patented May 9, 1933

1,908,057

UNITED STATES PATENT OFFICE

KARL RUCKSTUHL, OF OBERWINTERTHUR, SWITZERLAND

INSULATING MEANS AGAINST HEAT

Application filed November 28, 1930, Serial No. 498,784, and in Germany December 1, 1929.

My invention relates to insulating means and has for its object the use of flexible pipes made from thin sheets of polished metal and wound around the piping.

Reference is to be had to the accompanying drawing in which

Fig. 1 shows a flexible pipe made from metal and wound around a pipe.

Fig. 2 shows a section through a flexible pipe made from polished metal and filled with light insulating material.

a is a flexible pipe or hose made from a thin sheet of polished metal in the following way. A long narrow sheet of metal is cut off and the latter is wound around a pipe like the adjacent threads of a screw. After having finished the work the pipe is pulled out and the twisted metal sheet forms a flexible pipe. Aluminum is specially used as material for the thin metal sheet. Of course, other polished thin metal sheets could also be used. The particular constructional form of the flexible pipe renders it very stiff, which feature is of great importance in view of the increased stresses which arise when the said pipe is wound around the piping. Additional strength is imparted to the pipe by filling the latter with insulating material, which consists specially of paperflakes, wastes of clothes, infusorial earth etc.

Without changing the idea of the invention the cover a made from a thin metal sheet could be wound around a wire. If desired the cover could be left empty so that the inside of the pipe shows an empty space. The section of the cover a of the flexible pipe shows a circular circumference, but practically the section shows the shape a1 of Figure 2. The placing of the flexible pipe around a piping is very simple. The cover a is wound tightly around the pipe c, which has to be insulated, like the threads of a screw. The windings are pressed together tightly so that an entirely solid layer covers the whole pipe. Therefore an insulating layer protects the pipe against losses of heat from inside and outside. Another layer of paper and other material or a thin plate of metal could be arranged on the insulating layer as a protection layer.

I claim:
1. An insulating means ready to be applied upon a pipe or any other object to be insulated against high or low temperatures, comprising a thin narrow sheet of polished metal wound into a helix the turns of which rest against one another so as to form a continuous tube of uniform cross section, which is wound round the object to be insulated.

2. An insulating means ready to be applied upon a pipe or any other object to be insulated against high or low temperatures, comprising in combination; a thin narrow sheet of polished metal wound into a helix the turns of which rest against one another so as to form a continuous tube of uniform cross section, which is wound round the object to be insulated; and a filling of insulating material within said tube.

3. An insulating means ready to be applied upon a pipe or any other object to be insulated against high or low temperatures, comprising in combination: a thin narrow sheet of polished metal wound into a helix the turns of which rest against one another so as to form a continuous flexible tube of uniform cross section, which is wound round the object to be insulated; and a filling of insulating material in powder form within said tube.

4. An insulating means ready to be applied upon a pipe or any other object to be insulated against high or low temperatures, comprising in combination: a thin narrow sheet of polished metal wound into a helix the turns of which rest against one another so as to form a continuous flexible tube of uniform cross section, which is wound round the object to be insulated; and a filling of infusorial earth within said tube.

In testimony whereof I affix my signature.

KARL RUCKSTUHL.